United States Patent [19]

Matsuyama et al.

[11] 4,323,381
[45] Apr. 6, 1982

[54] METHOD FOR PRODUCING MOTHER RODS FOR OPTICAL FIBERS

[75] Inventors: Iwao Matsuyama, Sagamihara; Kenzo Susa, Hinodemachi; Tsuneo Suganuma, Tokorozawa; Shin Satoh, Iruma; Toshio Katsuyama, Kokubunji; Hidehito Obayashi, Tokyo, all of Japan

[73] Assignee: Hitachi, Ltd., Tokyo, Japan

[21] Appl. No.: 169,638

[22] Filed: Jul. 17, 1980

Related U.S. Application Data

[63] Continuation-in-part of Ser. No. 113,340, Jan. 18, 1980, abandoned.

[30] Foreign Application Priority Data

Jan. 19, 1979 [JP] Japan .................................... 54/3957

[51] Int. Cl.³ .............................................. C03B 5/16
[52] U.S. Cl. .......................................... 65/32; 65/22; 65/134; 501/12; 252/317
[58] Field of Search ............... 65/22, 32, 134; 106/52, 106/54; 252/317

[56] References Cited

U.S. PATENT DOCUMENTS

| | | | |
|---|---|---|---|
| 3,597,252 | 8/1971 | Schröder | 65/17 |
| 3,767,434 | 10/1973 | Thomas | 252/317 X |
| 4,013,436 | 3/1977 | Van Der Steen | 65/32 |
| 4,028,085 | 6/1977 | Thomas | 106/52 X |
| 4,030,938 | 6/1977 | Thomas | 65/134 X |
| 4,098,595 | 7/1978 | Lenz et al. | 65/17 |

*Primary Examiner*—Arthur D. Kellogg
*Attorney, Agent, or Firm*—Birch, Stewart, Kolasch & Birch

[57] ABSTRACT

A process for producing a mother rod useful for the production of an optical fiber which comprises hydrolyzing a silicon alkoxide to prepare a gel of a desired shape, and drying and sintering the gel to produce a block made of a silica glass. The process has the advantages that it is well adapted for mass-production, that a glass made of a $B_2O_3$—$SiO_2$ system may be produced thereby and that a glass block of arbitrary shape may be readily produced.

56 Claims, 3 Drawing Figures

METHOD FOR PRODUCING MOTHER RODS FOR OPTICAL FIBERS

This is a Continuation-in-Part of copending application Ser. No. 113,340, filed on Jan. 18, 1980 now abandoned.

BACKGROUND AND SUMMARY OF THE INVENTION

1. Field of the Invention

The present invention relates to a method for producing mother rods useful for the production of optical fibers wherein the rods are manufactured without going through the step of fusing or melting the glass.

2. Brief Description of the Prior Art

Optical fibers are used for various applications including, for example, extremely short distance light transmission elements such as gastrocamera fiberscopes, long distance light transmission systems such as optical communication systems, and the like. They are mainly made of a high content silica glass containing a dopant for adjusting the refractive index of the glass, if required.

Conventionally known methods for producing such optical fibers are (i) a method of melting the starting material in a crucible or port to form fibers from the molten glass, (ii) a method of forming a high silica glass membrane on the inside wall of a quartz tube by means of the CVD Method (Chemical Vapor Deposition Method), collapsing the thus formed tubular membrane and then drawing the same to form fibers, and (iii) a method of forming glass soot by means of the CVD Method, axially depositing and sintering the soot and then drawing the resultant sintered body to form fibers.

However, these known methods have the following disadvantages. By the method set forth in (i) above, optical fibers of high purity cannot be produced for the reasons that a glass of high silica content is difficult to prepare; that difficulties are encountered in purification of the starting material; and that contamination with the ingredients of the used pot cannot be obviated. The method set forth in (ii) above is disadvantageous because it does not lend itself to mass producibility; a large-sized mother rod and a multicomponent glass, containing a relatively large amount of Na cannot be produced, the yield is reduced when P, Ge, B or the like is used as the dopant element since a thermal oxidation reaction is utilized in this method, and because an expensive production facility is required. The method set forth in (iii) is disadvantageous in that a multicomponent glass cannot be produced; it does not lend itself to mass producibility; and an expensive production facility is required. A further disadvantage of the known methods is that a glass body of an arbitrary shape cannot be formed by any of the methods (i), (ii) and (iii). Furthermore, the products made by these known methods are inevitably increased in cost, since in either of the methods (ii) and (iii) silicon oxide is formed under a high temperature condition, and in the method (i) the glass must be adequately melted at a high temperature.

On the other hand, a method of preparing a porous glass at a relatively low temperature is known. In this method, a high content silica gel containing silica or any other dopant oxides is obtained by hydrolyzing silicon alkoxide, with the optional addition of alkoxides of any desired elements.

Also well known in the art is a method wherein a liquid mixture mainly composed of silicon alkoxide is dropped onto the liquid surface of an appropriate liquid or drawn in the liquid followed by sintering with heat to produce a film-shaped or fibrous glass product. However, this method has serious disadvantages in that the shape of the products produced thereby is limited to an extremely narrow range and the product is unstable in shape and lacks uniformity.

The state of the art is exemplified by Japanese Pat. Publication No. 6604/1973, Japanese Pat. Laid-Open No. 34219/1976 and M. Yamane et al, *Journal of Materials Science*, 13 (1978), pages 865–870.

SUMMARY OF THE INVENTION

An object of the present invention is to provide a method for producing mother rods from which fibers adapted for use as satisfactory optical fibers can be easily produced, and wherein the disadvantages of the prior art methods referred to above are overcome.

Others objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from the detailed description.

The method of the present invention for producing a mother rod which, in turn, can be used to manufacture optical fibers generally comprises the steps of forming a gel in a predetermined shape from a mixed solution comprising a silicon alkoxide having the formula $Si(OR)_4$ wherein R is an alkyl group having from 1 to 4 carbon atoms, water and a polar organic solvent which functions to make the system miscible, drying the resulting gel to form a dry gel, and then sintering the dry gel at its collapse temperature but lower than the melting temperature of the dry gel.

Advantageously, the procedure of the invention is carried out by (i) mixing a silicon alkoxide represented by the general formula $Si(OR)_4$, wherein R is an alkyl group, with water and a polar organic solvent, suitably an alkanol, acetone, dioxane, dimethylformamide or mixtures thereof, until the silicon alkoxide is completely dissolved in the water to form a mixed solution (this mixed solution being a sol), (ii) pouring the mixed solution into a container of predetermined shape, (iii) leaving the mixed solution while covering and sealing the opening of the container with cover means to hydrolyze the mixed solution to form a gel, (iv) drying the gel slowly to form a dry gel, and (v) heating the dry gel to raise the temperature thereof gradually and then sintering the same at a temperature within the collapse temperature (i.e. the temperature which makes a porous material non-porous) and lower than the melting temperature of the dry gel, whereby a mother rod for optical fibers is produced.

In the step (i) described above, the quantity of water added to the silicon alkoxide (hereinafter represented by $Si(OR)_4$) is 2 to 16 times that of the $Si(OR)_4$ in terms of molar ratio. If the quantity of added water is less than 2 times that of the $Si(OR)_4$, the gel is hardly formed, whereas if the quantity of added water is in excess of 16 times that of the $Si(OR)_4$, the formed gel becomes unstable. Thus, in both the cases where the quantity of added water is out of the defined range, undesirable results are obtained.

The alkoxides of the formula $Si(OR)_4$ used in step (i) are those which are liquid at ambient temperature, and $Si(OCH_3)_4$ or $Si(OC_2H_5)_4$ is most commonly used. In the case when $Si(OC_2H_5)_4$ is used, an acidic compound is further added to the mixed solution in a molar ratio of 0.003 to 0.2 that of the quantity of $Si(OC_2H_5)_4$. This acidic compound acts as a catalyst for the hydrolysis reaction of the mixed solution for forming a gel. Hydrochloric acid and similar acidic compounds may be used for this purpose. In either of the cases where the quantity of the acidic compound is out of the above-mentioned range, the results are undesirable since if the added quantity thereof is less than 0.003 times the quantity of $Si(OC_2H_5)_4$, the catalytic function for promoting the formation of the gel cannot be expected and if the added quantity of the acidic compound is in excess of 0.2 times the quantity of $Si(OC_2H_5)_4$, the gelation speed becomes too high and hence makes the operation inconvenient.

The polar organic solvent used in step (i) for miscibility purposes may be an alkanol such as a monohydric alcohol which is liquid at room temperature, e.g., methanol, ethanol, propanol, isopropanol, butanol, etc. or other miscible organic solvents such as ketones, amides and the like, e.g., acetone, dioxane, dimethylformamide, or mixtures thereof. It can be readily judged visually whether the $Si(OR)_4$ and water are completely mutually dissolved or not.

When it is desired to produce a mother rod for optical fibers having a refractive index different from that of pure quartz, a dopant comprising an alkoxide of an addition element for changing the refractive index of the transparent quartz glass can be used in step (i) in place of pure $Si(OR)_4$. Such an alkoxide is optionally in an amount that gives the desired refractive index, the amount of the element required to be added to the quartz glass being well known in the art. Generally, such dopants constitute compounds containing boron, phosphorus, germanium, zirconium, titanium or aluminum. If either P or B is selected as the addition element, phosphoric acid and boric acid may be used, respectively, in place of the alkoxides thereof. When an alkoxide of an element expected for changing the refractive index of the quartz glass is added to the $Si(OR)_4$, the added quantity of water is increased depending on the molar number of the added alkoxide. The additional quantity of water to be added corresponds to 2 to 16 times the molar number of the added alkoxide, in molar ratio. The reason for this is the same as has been described hereinbefore with regard to the case where $Si(OR)_4$ is used singly.

Examples of the compounds which may be used in the present invention as the alkoxides for changing the refractive index of the transparent quartz glass are $B(OCH_3)_3$, $B(OC_2H_5)_3$, $B(OC_3H_7)_3$, $PO(OCH_3)_3$, $PO(OC_2H_5)_3$, $PO(OC_3H_7)_3$, $Ge(OCH_3)_4$, $Ge(OC_2H_5)_4$, $Ge(OC_3H_7)_4$, $Ge(OC_4H_9)_4$, $Zr(OC_3H_7)_4$, $Zr(OC_4H_9)_4$, $Ti(OC_3H_7)_4$, $Ti(OC_4H_9)_4$ and $Al(OC_4H_9)_3$.

The container used in step (ii) should have an internal figure or contour of the same shape as the desired glass block to be produced, and the internal dimensions of the container should be about 2.5 times as large as those of the desired glass block. This is because the dry gel shrinks to dimensions which are about one-half that of the gel prior to drying during step (iv) and it further shrinks in step (v), so that the final dimensions of the produced glass block are decreased to about 0.4 times that of the gel prior to drying, i.e. decreased to about 0.4 times those of the internal dimensions of the container employed in the step (ii). However, it is not practical to fully fill the container with the mixed solution (sol) and it is the general practice to charge the sol therein until about 80% of the capacity of the container is filled, and correspondingly the dimensions of the container should be enlarged for providing such an empty space. When it is intended to produce a mother rod for glass fibers, the generally preferred container is cylindrical.

The material from which the container is made may be arbitrarily selected provided that it withstands the drying temperature of about 50° to 120° C. during step (iv) for drying the gel and does not react with the mixed solution. However, a transparent material is preferred for visually observing the state of the charged content in the container during steps (iii) and (iv), a specific example of such material being a glass.

Since the gel prior to drying has a pudding-like and soft consistency and there is the risk of it being cracked even by a small amount of stress, it is necessary to dry the gel uniformly and to allow the gel to shrink evenly so that the gell will not be subjected to stress while drying when, for example, producing a long glass rod useful for the production of optical fibers. As an exemplified measure for solving this problem, good results can be obtained by employing a cylindrical container provided with a cone-shaped portion at its bottom for use in step (ii). The vertical or face angle of the cone-shaped portion in the sectional plane containing the central axis of the container may range from 60 to 120 degrees. If the face angle is less than 60 degrees, the cone-shaped portion of the resultant dry gel becomes too long and therefore decreases the effective portion, which is undesirable from an economical point of view. On the contrary, if the face angle exceeds 120 degrees, the tendency for the gel to concentrate at the center of the bottom portion of the container is reduced.

The material for the cover means sealingly closing the opening of the container in step (iii) may be arbitrarily selected provided that it withstands the temperature of 10° to 120° C. in the gelation step, but must be one which withstands the temperature of 50° to 120° C. in the gel drying step if the same cover means is used during the latter step. As an expedient means, aluminum foil or silver foil may be used. It is not required to use such a cover means, and impurities may be evaporated directly from the wet gel.

It is advantageous that the temperature at which the container containing the mixed solution in step (iii) is allowed to stand be 10° to 120° C. In this step, the mixed solution initially forming a sol is hydrolyzed to form a gel as the hydrolysis proceeds. The time during which the container is left standing corresponds, therefore, to the time period required for completing the gelling or gelation beginning from the time at which the mixed solution is poured into the container. This generally requires about 4 to 100 hours, in most cases. The higher the temperature at which the container is left standing, the shorter the time period required for gelation. If the temperature is lower than 10° C., the time period required for gelation is prolonged, which is undesirable from an economical point of view. On the other hand, if the temperature exceeds 120° C., the gelation proceeds too rapidly and often causes cracks in the formed gel. The completion of gelling may be judged by inclining the container to ascertain whether the mixed solution has lost its fluidity. In doing so, the whole mass contained in the container should no longer flow. The gelling time may be set to a predetermined time period by a preparatory experiment in which the time period required for complete gelling is ascertained.

The gel formed by the hydrolysis which takes place in step (iii) includes a large amount of water and the polar organic solvent employed internally therein. It will be referred to as a "wet gel" hereinafter.

The drying of the wet gel in step (iv) is carried out at a temperature higher than 50° C. and lower than the boiling point of the solvent in the mixed solution until the dimensions of the gel are decreased to about ½ the initial length, i.e. the volume thereof decreases to about ⅛, and the weight thereof is reduced to about 1/5 of the initial weight. If the drying temperature is lower than 50° C., the time period required for drying is prolonged excessively, which is disadvantageous from an economical point of view. The drying temperature should be lower than the boiling point of the solvent in the mixed solution, i.e. lower than the boiling point of the solvent added to the mixed solution. Among the alcohols which may be commonly used are included $CH_3(CH_2)_4OH$ and $CH_3(CH_2)_3OH$, which have relatively high boiling temperatures of 138.3° C. and 117.5° C., respectively. When taking into account these boiling points, the drying temperature may be established to be lower than 120° C., but, of course, it is not limited to this range, depending on the particular solvent used.

There is a risk of the formation of cracks in the gel if the drying speed in the step of drying the wet gel is too high. To prevent this, the drying speed is set so that the weight reduction rate is less than 40%/day based on the initial weight of the wet gel. Although the quality of the obtained dry gel is not adversely affected if the drying speed is made very slow, it is uneconomical, as such. It is preferred that the weight reduction rate in the step of drying the gel be about 10 to 20%/day based on the initial weight of the wet gel. Within this range, cracks rarely form in the gel and the time period required for drying is not overly extended.

During the drying step illustrated by step (iv), the large quantities of water and organic solvent included in the gel are removed from the internal portions of the gel very slowly. As an exemplified drying method, the cover means used in step (iii) is provided with a plurality, e.g. up to 40 and even a higher number of pinholes having diameters of about 1 mm which serve as the discharge holes through which evaporating water and solvent removed from the gel are expelled from the container, and the gel is maintained at a predetermined temperature, as well. The drying speed may be adjusted by the number of pinholes provided in the cover means.

Drying of the wet gel is usually conducted under an atmosphere of an inactive gas such as $N_2$, Ar, He, etc. or in the presence of molecular oxygen ($O_2$) including clean air.

The collapsing temperature in step (v) is generally higher than about 1000° C., usually higher than 1050° C., and the sintering time period, i.e. the period of time for heating at the collapse temperature, ranges generally from about 2 to 48 hours. This sintering step is provided to collapse the dry gel and to produce a mother rod for optical fibers. The gel is not sufficiently collapsed for forming optical fibers if the sintering temperature is lower than about 1000° C., and even when the gel is sintered at a temperature higher than 1050° C. the gel is not sufficiently collapsed if it is retained at that temperature only for a time period of less than about 2 hours. Although the lower limit of the collapsing temperature may be varied to some extent depending on the property of the dry gel, the lower limit of the collapsing temperature is normally within the range of about 1000° to 1200° C. In general, the sintering time period will be less than 48 hours since it is uneconomical without any attendant advantage in continuing the sintering for a prolonged period of time. However, the sintering time period need not be limited to this range.

The rate at which the temperature is raised in step (v) is less than 300° C./hr until the temperature reaches 700° C. and is then lowered to a rate of 60° C./hr after the temperature has been raised beyond 700° C. It is undesirable to increase the temperature raising rate to greater than the speed defined above, since there is a tendency for cracks to form in the dry gel. Generally, dehydration of the dry gel occurs within the temperature range of 100°–250° C. and oxidation takes place within the range of 250°–700° C.

The atmosphere utilized during step (v) may be clean air. However, in order to facilitate the escape of the organic materials or the like which might be residing in th dry gel, and in order to obtain better results, it is preferred that the atmosphere be oxygen or a mixed gas of oxygen and helium containing more than 1% of oxygen. Also, good results may be obtained when a helium atmosphere is employed during the sintering step or when the sintering is conducted under vacuum.

Furthermore, the temperature raising process in step (v) may be preferably divided into two stages, wherein the stage of raising the temperature from 700° C. to 1000° C. is effected in a chlorine-containing atmosphere, for decreasing the OH content of the produced optical fiber. The chlorine-containing atmosphere may be provided by chlorine gas itself or by a compound which decomposed to form $Cl_2$ under the conditions of heating, such as $SOCl_2$ or $CCl_4$. The heat treatment sequence in this preferable process will now be described. The temperature raising rate is maintained at a speed of less than 300° C./hr until the temperature of the gel reaches 700° C. while the atmosphere is composed of, for example, molecular oxygen or a mixed gas of oxygen and helium containing more than 1% of oxygen. Even if chlorine is added to the atmosphere under which the temperature raising operation is carried out at a temperature of lower than 700° C., no appreciable dehydroxylation effect is observed. The temperature raising operation of from 700° C. to 1000° is carried out under an atmosphere composed of, for example, oxygen containing more than 1%, preferably more than 5%, of chlorine, an atmosphere composed of helium containing more than 1%, preferably more than 5%, of chlorine or an atmosphere composed entirely of chlorine gas at a temperature raising rate of less than 60° C./hr, and the gel is maintained at about 800° C., about 900° C. and about 1000° C., respectively, for more than 30 minutes, preferably more than one hour. The temperature raising operation from 1000° C. to the collapse temperature which is often higher than 1200° C., is carried out under a helium atmosphere or under vacuum at a temperature raising rate of less than 60° C./hr. Furthermore, the dry gel is sintered by maintaining it at the collapse temperature of higher than 1200° C. under the helium atmosphere or under vacuum for a time period of more than about one hour to produce a mother rod for optical fibers. As noted above, the chlorine gas may be generated by the decomposition at high temperature of a compound which decomposed to generate chlorine, such as $SOCl_2$ or $CCl_4$.

Although in the typical example described above the dry gel has been maintained at 800° C. 900° and 1000° C., respectively, for a time period of more than 30 minutes, it is a more generalized practice to maintain the gel at any desired temperature within the range of from 700° to 1000° C. at least one time under a chlorine-containing atmosphere for a total time period of about 1 to 20 hours. As will be readily understood by those skilled in the art, the higher the temperature at which the dry gel is maintained, the shorter the time period during which the gel is allowed to stand at that temperature, so that it suffices to maintain the gel at 1000° C. for an hour, whereas it is required to maintain the gel for a time period of about 20 hours if the gel is allowed to stand at only 700° C. Although the gel may be maintained at a high temperature for a time period of more than 20 hours, it is uneconomical to do so since no further improvement in the advantageous effect would be observed.

Although there has been described hereinbefore a process for producing a mother rod useful for the production of optical fibers which mother rod gives optical fibers of uniform refractive index when extended in a conventional manner, the process of the present invention may be applied to the production of a mother rod for optical fibers having portions in which the refractive index differs.

In detail, a cylindrical wet gel of a silica glass is produced which contains a required amount of an addition element required for obtaining the desired refractive index for forming the core portion of an optical fiber. The thus produced wet gel for forming the core portion is placed in the center of a cylindrical container having a diameter larger than the outer diameter of the wet gel. A mixed solution prepared as in step (i) above and containing the amount of addition element required for obtaining the desired refractive index to form the clad portion is then charged in-between the core portion and the inside peripheral wall of the container. The container is then sealed and left standing, whereby a cylindrical wet gel having a dual-component construction comprising a core wet gel positioned centrally of the container and a concentrically superposed surrounding clad layer of annular shape can be obtained. The following procedures are similar to the case of the production of a single-component mother rod for optical fibers mentioned hereinabove, that is through steps (iv) and (v), to produce a mother rod for an optical fiber having a dual-component construction comprising a core portion and a pheripheral portion whose refractive indices differ from each other. Moreover, following the general procedures as described above, with the bottom portion of the cylindrical wet gel forming the core portion shaped to be conical, and using a container having the corresponding bottom portion in the step of forming the clad portion, the deflection or shifting of the wet gel forming the core portion from the center of the container can be conveniently eliminated to place the core portion precisely at the intended position automatically so that it becomes possible to obtain good results. Either the wet gel forming the core portion or the mixed solution forming the clad portion may be initially introduced into the container. Alternatively, an annular or tubular wet gel forming the clad portion is initially prepared and this is fitted over another cylindrical container having an inner diameter the same as the outer diameter of this tubular wet gel, followed by pouring a mixed solution for forming the core portion into the central portion of the tubular wet gel, sealing the container and allowing the gelatinization of the mixed solution present at the center portion engaging with the internal periphery of the wet gel forming the clad portion.

A similar procedure may be utilized to produce an optical fiber pre-form having a construction comprising more than three portions different in refractive index. In order to prepare a tubular gel, a column, for example made of Teflon (polytetrafluoroethylene), having a diameter smaller than that of the cylindrical container is placed in the center of the container to form a tubular container into which a mixed solution is poured, and then the column is drawn out of the container after a tubular gel is formed. It should be noted here that the refractive indices of respective layers are not abruptly varied discontinuously but are varied continuously or gradually at the boundary zones therebetween, since the mother rod for the multicomponent optical fiber is exposed to a high temperature during the sintering step so that the elements contained in the respective layers are diffused into the adjacent layers. The longer the sintering time period, the more gradually the composition varies at the boundary zones. In fact, it is the general practice to use a composition which does not contain an addition element in forming a gel corresponding to the portion which is to be imparted with the same refractive index as that of the quartz.

The process for producing a mother rod for optical fibers according to the present invention as has been described above generally has the following advantages:

(i) Since the process is simplified and practiced with the use of a simple apparatus, the process can be easily controlled with good reproducibility and the apparatus used for practicing the process is inexpensive.

(ii) It is excellent for mass-producibility and a large quantity of a uniform product may be produced with a unit batch.

(iii) Since a glass block of arbitrary shape may be produced by changing the shape of the container into which the mixed solution is poured, a glass product other than a mother rod for optical fibers can be produced through the same process.

(iv) Since the steps for preparing the dry gel are carried out at room temperature or at a temperature near room temperature, glasses including the $B_2O_3$—$SiO_2$ system or novel glass compositions which are nearly impossible to produce by the prior art fusing method may be produced. Also, the production of glass products of novel composition to be used for applications other than optical fibers may be expected.

(v) Since the loss of an addition element such as P, Ge or B is decreased and the yield rate of such element is, for example, as high as 70–80%, the yield rate of such an element achieved by the conventional CVD Method being about 30–50%, the composition of the produced glass is in good correspondence to the composition of the starting material mixture, resulting in a good yield rate of the addition element and excellent reproducibility of the composition of the product.

(vi) Since the treating temperature in the steps for preparing the dry gel is low, contamination with impurities is minimized.

(vii) Since a starting material in liquid form is used, it is possible to highly purify the starting material by distillation.

BRIEF DESCRIPTION OF THE DRAWINGS

The present invention will now be described in detail with reference to the following Examples which are provided as being exemplary of the present invention and thus should not be considered as limiting the scope of the present invention.

EXAMPLES OF THE INVENTION

Example 1

1 mol of $Si(OCH_3)_4$, 4 mols of $CH_3OH$ (alcohol and 4 mols of $H_2O$ were intimately mixed together to obtain a solution which was charged in a cylindrical container of 7.5 mm in diameter and 250 mm in length until about eight-tenths of the container was filled with this solution. The top opening of the container was sealingly closed by an aluminum foil, silver foil or another like cover member and the solution contained in the container was left standing at 10°–60° C. A gel was formed after a lapse of time varying from 4 hours to 100 hours or more depending on the temperature at which the solution was left standing.

Figure 1:
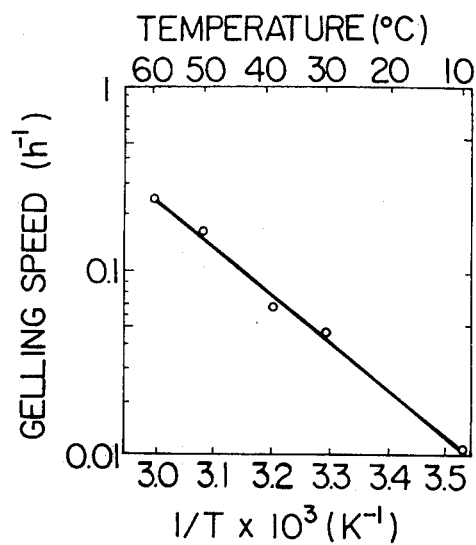
FIG. 1 is a graph showing the gelation speed in terms of the temperature in one example of the present invention.

The interrelationship between the gelling speed and the temperature is shown in FIG. 1. In FIG. 1, the gelling speed (in $h^{-1}$), i.e., the inverse number of the time period required for gelation, is shown in terms of the temperature (in °C.) and the inverse number (in $K^{-1}$) of the absolute temperature. Large amounts of water and alcohol were included internally of the gel at this stage, from which water and the alcohol were removed very slowly, for example by providing the top sealing cover member with a plurality of pinholes, e.g., about 3 to 40 pinholes each having a diameter of about 1 mm through which vapors could be expelled. Drying was conducted at a drying speed at which the weight reduction rate was 10%/day based on the initial weight of the wet gel. The gel gradually shrinks as water and the alcohol are removed, and when the volume of the gel reaches ⅛ of the initial volume and the weight thereof reaches 1/5 of the initial weight, the water and the alcohol are substantially removed. The gel at this state is referred to as a "dry gel" throughout the specification. In this example, the wet gel was held in air at 50° C. for 10 days to obtain the dry gel. The dimensions of the thus obtained dry gel were about 3.8 mm in diameter and about 100 mm in length.

The dry gel was then taken out of the container and put into an electric furnace, and the temperature was increased at a rate of 200° C./hr until it reached 700° C. and then increased at a rate of 50° C./hr from 700° to 1050° C. in an air atmosphere. The dry gel heated to 1050° C. was then held at this temperature for 5 hours to produce a rod made of pure silica glass. The sintering step mentioned just above was conducted in an air atmosphere.

The resultant rod of silica glass had a diameter of about 3.0 mm and a length of 80 mm. The density, refractive index, hardness and coefficient of linear expansion were, respectively, 2.20 $gr/cm^3$, 1.461, 780 $kg/mm^2$ and $5.5 \times 10^{-7}$. These values approximated those of the commercially available silica glass produced by a fusing method having a density of 2.20 $gr/cm^3$, a refractive index of 1.458 nd, a hardness of 790 $kg/mm^2$ and a coefficient of linear expansion of $5.5 \times 10^{-7}$. The silica glass rod produced in accordance with this example was well suited for use as a mother rod for producing optical fibers.

Example 2

The procedure of Example 1 was repeated, except that 4 mols of acetone was used in the starting mixture in place of the alcohol. The same results were obtained.

Example 3

The procedure of Example 1 was repeated, except that 4 mols of dioxane was used in the starting mixture in place of the alcohol. Again, the same results were obtained.

Example 4

The procedure of Example 1 was repeated, except that 4 mols of dimethylformamide was used in the starting mixture in place of the alcohol, and that the wet gel was held at 80° C. for 3 days and then heated from 80° to 170° C. for 3 days to dry the wet gel. The same results as in Example 1 were obtained.

Example 5

10 mol% of $PO(C_2H_5O)_3$ was added to the starting material as used in Example 1, from which a gel was prepared. The subsequent process steps were similar to those described in Example 1 to obtain a glass rod. As a result, a $SiO_2$—$P_2O_5$ system glass rod having a refractive index higher than that of the $SiO_2$ glass was produced. The yield rate of P in this example was about 75%.

Example 6

10 mol% of $Ge(OC_2H_5)_4$ was added to the starting material used in Example 1, and following the process thereof, a glass rod having a $SiO_2$—$GeO_2$ system was successfully produced. The yield rate of Ge in this example was about 75%.

Example 7

As is apparent from the preceding examples, when $Si(OCH_3)_4$ and $H_2O$ are mixed with each other with the addition of an alcohol, a homogeneous hydrolysis reaction takes place. However, in the case where $Si(OC_2H_5)_4$ is used, a uniform solution is not formed merely by mixing it with an alcohol, and as a result of homogenous hydrolysis reaction does not take place. Also, the reaction speed of the hydrolysis is lower than that occurring in the case of $Si(OCH_3)_4$. It is, therefore, necessary to add an acid which serves as a sort of catalyst in order to render uniform or homogenize the solution, and thereby accelerate the hydrolysis. Hydrochloric acid or a like acid may be used for this purpose.

In this example, Si(OC$_2$H$_5$)$_4$ and C$_2$H$_5$OH were mixed together at a molar ratio of 1:4 and the mixture was held at 75° C. and mixed with an aqueous solution of HCl to prepare a sol which was put into a container followed by the steps of gelation, drying and sintering similarly as in Example 1, whereby a rod of pure silica glass was produced. The added aqueous solution of HCl was prepared by mixing HCl in an amount of 0.05 times in molar ratio based on the molar number of Si(OC$_2$H$_5$)$_4$ with water amounting to 4 times the molar number of Si(OC$_2$H$_5$)$_4$.

Example 8

Si(OCH$_3$)$_4$ and CH$_3$OH were mixed together at a molar ratio of 1:4 and added with an aqueous solution of boric acid to prepare a sol which was charged in a container followed by the steps of gelation, drying and sintering similarly as in Example 1, whereby a glass rod made of a SiO$_2$—B$_2$O$_3$ system was produced. The added aqueous solution of boric acid was prepared by mixing H$_3$BO$_3$ in an amount of 0.1 times in molar ratio based on the molar number of Si(OCH$_3$)$_4$ with water amounting to 4 times the molar number of Si(OCH$_3$)$_4$.

Example 9

In order to produce a long-size glass rod for use as a material for an optical fiber, a gel rod ready for sintering was obtained by placing the starting material liquid into a container having a corresponding length, gelatinizing the material and then drying it slowly. However, the wet gel immediately after the hydrolysis contains water and the alcohol and forms a pudding-like body which tends to crack, even with a small amount of stress. For this reason, it is necessary to adopt a method whereby the wet gel is evenly dried to make the shrinkage of the gel uniform due to the removal of water and alcohol so as not to cause an imbalance in the stress.

According to this example, a portion of the container was designed, as will be described hereinbelow, to make the drying of the wet gel uniform.

Figure 2:
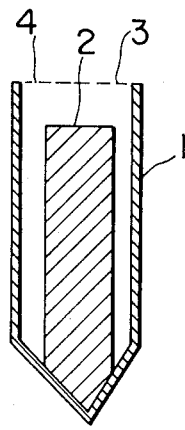
FIG. 2 is a diagrammatic sectional view showing an apparatus used in the step of drying the gel in another embodiment of the present invention.

As shown in FIG. 2, a cylindrical container 1 in which the solution is gelatinized is provided with a conical bottom portion. Reference numeral 3 designates a lid provided with a plurality of pinholes 4. With the use of such a container, a wet gel 2, as shown in the Figure, which is shrunk somewhat in size, is evenly dried to remove water and alcohol and also to shrink it in the axial and radial directions while it is continuously positioned concentrically relative to the cylindrical container and while retaining its column-like shape.

In this example, a silica glass rod was produced similarly as in Example 1 except that a container having the same shape as shown in FIG. 2 is used for holding the sol. As a result, no appreciable cracking was formed during the drying step for drying the wet gel, thereby producing a silica glass rod of excellent quality. This rod was adapted for use as a mother rod for producing optical fibers.

Example 10

Figure 3:
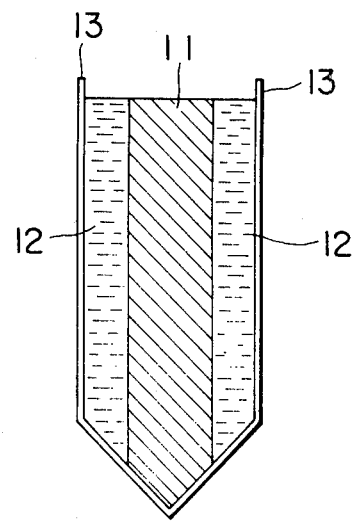
FIG. 3 is a diagrammatic sectional view showing an apparatus in which a mixed solution for forming the clad portion is charged in addition to the centrally positioned core portion made of a previously gelatinized wet gel for producing a mother rod for an optical fiber having a dual-component construction according to a further embodiment of the present invention.

Generally, in accordance with a similar procedure as described in Example 5, Si(OCH$_3$)$_4$ and PO(OC$_2$H$_5$)$_3$ were mixed and then hydrolyzed concurrently to prepare a sol which was charged into a cylindrical container provided with a conical bottom portion, and the sol was then gelatinized. This gel was a wet gel containing large amounts of water and alcohol and commenced to shrink gradually as the removal of water and the alcohol proceeded. At the time when the wet gel began to shrink and separate from the wall of the container, the gel was put into another container 13 of similar shape but having a larger diameter than that of the wet gel 11 as shown in FIG. 3, and at the same time a second sol solution 12 was poured into the tubular space, the second sol solution having a composition different from that of the wet gel 11, for example a sol composed only of Si(OCH$_3$)$_4$, or a sol composed of a hydrolyzed product of a mixture of Si(OCH$_3$)$_4$ and PO(C$_2$H$_5$O)$_3$ but containing a lesser amount of the alkoxide of P or a hydrolyzed product of a Si(OCH$_3$)$_4$—B(OC$_2$H$_5$)$_3$ system.

The container 13 was then sealingly closed to concentrically gelatinize the formerly gelatinized wet gel 11 into the core portion, whereby a wet gel having a dual-component construction was prepared. Thereafter, this dual-component gel was dried slowly to obtain a dry gel, containing smaller amounts of water and alcohol, which did not develop cracks even if taken out of the container in a room. This dry gel was then subjected to a heat treatment at 1000° C. to 1200° in an electric furnace to change the same to a transparent glassy preform which was drawn to produce an optical fiber. The gelation, drying and sintering steps were conducted under similar conditions as set forth in Example 1. Thus, an optical fiber having a construction comprising a core portion of high refractive index and a clad portion of low refractive index was obtained.

Although in this example, Si(OCH$_3$)$_4$ was used as the main starting material, it should be appreciated that similar products may be obtained from other silicon alkoxides represented by the general formula of Si(OR)$_4$, wherein R is an alkyl group.

Similarly, in preparation of gels located at the core portion and the peripheral portion, a variety of sols may be generally prepared by combining various starting liquid materials having different refractive indices other than the combination as described above.

Alternatively, it will be clearly understood that the container 13 shown in FIG. 3 may be firstly charged with a sol and then the wet gel 11 put into the container 13 while wedging away the pre-charged sol.

Example 11

A sol liquid was prepared by mixing Si(OCH$_3$)$_4$, H$_2$O and CH$_3$OH in a molar ratio of 1:4:4, which was poured into a glass container and gelatinized at 50° C. Then, the wet gel was heated to and held at 70° C. to dry the same at a drying speed at which the weight reduction rate based on the initial weight was set at 20%/day for evaporation to remove water and the alcohol to prepare a dry gel. The thus prepared gel had a diameter of 5 mm. This dry gel was put into an electric furnace adjusted to have an adequate inside atmosphere and sintered to produce a glass rod. The heating and sintering conditions were as follows. The temperature was raised at a rate of 200° C./hr until it reached 700° C. in an O$_2$ atmosphere. The atmosphere was changed to a Cl$_2$ atmosphere containing 50% of O$_2$ and at the same time the rate of temperature rise was changed to 50° C./hr and the temperature was raised to 1000° at that rate. Intermediate of this operation, the gel was held at 800° C., 900° C. and 1000° C., respectively, for one hour. The temperature was further raised at a rate of 50° C./hr to 1200° C. while changing the atmosphere to that composed of He, and then the gel was held at 1200° C. for 2 hours to produce a block of silica glass, i.e., a mother rod for an optical fiber. The diameter of this silica glass block was 4 mm.

The column-shaped silica glass block having the diameter of 4 mm was then put into a quartz tube having an inside periphery made of a silica glass layer doped with B which had been produced in accordance with a partial process of the CVD Method (this being the well-known rod-in-tube method), whereby a preform for an optical fiber was produced.

This pre-form was drawn by a well-known method in a high temperature furnace maintained at about 2000° C. to form an optical fiber.

The thus formed optical fiber had a refractive index distribution of the step-index type and a core diameter of 60 microns, a thickness of the clad layer of 15 microns and an outer diameter of 150 microns. The N.A. value (Numerical Aperture) of this optical fiber was 0.15 and the transmission loss, determined by a He-Ne laser with a wavelength of 0.63 micron, was 23 dB/km, which properties were approximately equivalent to those of the rod-in-fiber produced by using a conventional quartz tube.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A process for producing a mother rod useful in the production of an optical fiber which consists essentially of:
   (i) forming a gel in a predetermined shape in a container means which is similar to the shape of the desired glass block to be produced from a mixed solution comprising a silicon alkoxide having the formula $Si(OR)_4$ wherein R is an alkyl group, water and a polar organic solvent,
   (ii) drying the resulting gel to form a dry gel, and
   (iii) sintering the dry gel at its collapse temperature but lower than the melting temperature of the dry gel, thereby forming a glass block of the desired shape.

2. The process of claim 1, wherein said mixed solution further includes a dopant.

3. The process of claim 2, wherein said dopant is a compound containing boron, phosphorus, germanium, zirconium, titanium or aluminum.

4. The process of claim 2, wherein said dopant is a compound selected from the group consisting of $B(OCH_3)_3$, $B(OC_2H_5)_3$, $B(OC_3H_7)_3$, $PO(OCH_3)_3$, $PO(OC_2H_5)_3$, $PO(OC_3H_7)_3$, $Ge(OCH_3)_4$, $Ge(OC_2H_5)_4$, $Ge(OC_3H_7)_4$, $Ge(OC_4H_9)_4$, $Zr(OC_3H_7)_4$, $Zr(OC_4H_9)_4$, $Ti(OC_3H_7)_4$, $Ti(OC_4H_9)_4$, $Al(OC_4H_9)_3$, phosphoric acid and boric acid.

5. The process of claim 1, wherein said polar organic solvent is a member selected from the group consisting of alkanols, acetone, dioxane, dimethylformamide and mixtures thereof.

6. The process of claim 1, wherein said polar organic solvent is an alkanol.

7. The process of claim 1, wherein the dry gel is sintered at a temperature of about 1000° to 1200° C.

8. The process of claim 7, wherein the dry gel is sintered under vacuum or under an atmosphere of helium.

9. The process of claim 6, wherein the silicon alkoxide is $Si(OCH_3)_4$ or $Si(OC_2H_5)_4$.

10. A process for producing a mother rod useful in the production of an optical fiber which consists essentially of:
    (i) forming a gel in a predetermined shape in a container means which is similar to the shape of the desired glass block to be produced from a mixed solution comprising a silicon alkoxide having the formula $Si(OR)_4$ wherein R is an alkyl group, water and a polar organic solvent capable of imparting miscibility to the system,
    (ii) drying the resulting gel to form a dry gel,
    (iii) heating the dry gel to gently raise the temperature thereof, and
    (iv) sintering the dry gel at its collapse temperature but lower than the melting temperature of the dry gel, thereby forming a glass block of the desired shape.

11. The process of claim 10, wherein the dry gel is first heated in step (iii) at a temperature of about 100° to 250° C. and then at a temperature of about 250° to 700° C.

12. The process of claim 11, wherein said heating is conducted under a molecular oxygen-containing atmosphere.

13. The process of claim 12, wherein said heating is conducted under an atmosphere of oxygen or a mixture of oxygen and helium.

14. The process of claim 11, wherein the heating is subsequently conducted at a temperature of about 700° to 1000° C.

15. The process of claim 14, wherein said subsequent heating at about 700° to 1000° C. is conducted in the presence of chlorine gas or a chlorine-containing compound that decomposes to form chlorine gas under the conditions of heating.

16. The process of claim 15, wherein the dry gel is sintered at a temperature of about 1000° to 1200° C. under vacuum or under an atmosphere of helium.

17. The process of claim 16, wherein said mixed solution further includes a dopant.

18. The process of claim 10, wherein said polar organic solvent is a member selected from the group consisting of alkanols, acetone, dioxane, dimethylformamide and mixtures thereof.

19. The process of claim 10, wherein said polar organic solvent is an alkanol.

20. A process for producing a mother rod useful in the production of an optical fiber which consists essentially of:
    (i) mixing a silicon alkoxide having the formula $Si(OR)_4$ wherein R is an alkyl group with water and a polar organic solvent to produce a mixed solution;
    (ii) charging said mixed solution into a container having a predetermined shape which is similar to the shape of the desired glass block to be produced;
    (iii) gelatinizing the mixed solution in said container;
    (iv) drying the gelatinized mixture slowly to form a dry gel; and
    (v) heating said dry gel to gently raise the temperature thereof and then sintering said dry gel at the collapse temperature thereof but lower than the melting temperature of the dry gel, thereby forming a glass block of the desired shape.

21. The process of claim 20, wherein the opening of said container is sealed with a cover means during the gelatinization step.

22. The process of claim 20, wherein said silicon alkoxide is $Si(OCH_3)_4$ or $Si(OC_2H_5)_4$.

23. The process of claim 22, wherein the amount of water is 2 to 16 times, in molar ratio, that of said silicon alkoxide.

24. The process of claim 23, wherein said silicon alkoxide is $Si(OC_2H_5)_4$ and wherein said mixed solution also contains an acidic compound in an amount of 0.003 to 0.2 times, in molar ratio, that of said $Si(OC_2H_5)_4$.

25. The process of claim 24, wherein said acidic compound is hydrochloric acid.

26. The process of claim 23, wherein said silicon alkoxide is $Si(OCH_3)_4$.

27. The process of claim 23, wherein said container is a cylindrical container having a conically shaped bottom portion.

28. The process of claim 27, wherein the vertical angle of the conical bottom portion of said container is 60 to 120 degrees.

29. The process of claim 20, wherein the gelation temperature in said step (iii) ranges from about 10° to 120° C.

30. The process of claim 29, wherein the drying temperature in said step (iv) is higher than 50° C.

31. The process of claim 30, wherein in said step (iv) the gelatinized mixture is dried at a drying speed corresponding to a weight reduction rate of less than 40%/day based on the initial weight of said gelatinized mixture.

32. The process of claim 31, wherein said drying speed corresponds to a weight reduction rate of 10–20%/day based on the initial weight of the gelatinized mixture.

33. The process of claim 31, wherein the heating in said step (v) is conducted under an atmosphere of air, oxygen or a mixed gas of oxygen and helium.

34. The process of claim 33, wherein the sintering in said step (v) is conducted under an atmosphere of air, oxygen, helium or a mixed gas of oxygen and helium, or under vacuum.

35. The process of claim 34, wherein in said step (v) the temperature is raised up to 700° C. at a temperature raising rate of less than 300° C./hr and then further raised at a temperature raising rate of less than 60° C./hr after the temperature reaches 700° C.

36. The process of claim 35, wherein said dry gel is sintered at a temperature of higher than about 1050° C. for more than approximately two hours in said step (v).

37. The process of claim 20, wherein in said step (v) the temperature is raised up to about 700° C. at a temperature raising rate of less than 300° C./hr under an atmosphere comprising a gas selected from the group consisting of oxygen and a mixed gas of oxygen and helium followed by a further temperature raising from about 700° C. to about 1000° C. carried out at a temperature raising rate of less than 60° C./hr under an atmosphere comprising a gas selected from the group consisting of oxygen containing more than 1% of chlorine, helium containing more than 1% of chlorine and chlorine gas, the dry gel being held at said temperature of 700°–1000° C. at least one time for a total time period of more than an hour, and wherein the temperature raising from about 1000° C. to the collapse temperature is conducted at a temperature raising rate of less than 60° C./hr under an atmosphere of helium, the sintering being effected at a collapse temperature of higher than 1200° C. under an atmosphere of helium and for a time period of more than an hour.

38. The process of claim 20, wherein said mixed solution further includes a dopant for changing the refractive index of the glass.

39. The process of claim 38, wherein said dopant is a compound containing boron, phosphorus, germanium, zirconium, titanium or aluminum.

40. The process of claim 38, wherein said dopant is a compound selected from the group consisting of $B(OCH_3)_3$, $B(OC_2H_5)_3$, $B(OC_3H_7)_3$, $PO(OCH_3)_3$, $PO(OC_2H_5)_3$, $PO(OC_3H_7)_3$, $Ge(OCH_3)_4$, $Ge(OC_2H_5)_4$, $Ge(OC_3H_7)_4$, $Ge(OC_4H_9)_4$, $Zr(OC_3H_7)_4$, $Zr(OC_4H_9)_4$, $Ti(OC_3H_7)_4$, $Ti(OC_4H_9)_4$, $Al(OC_4H_9)_3$, phosphoric acid and boric acid.

41. The process of claim 20, wherein said polar organic solvent is a member selected from the group consisting of alkanols, acetone, dioxane, dimethylformamide and mixtures thereof.

42. The process of claim 20, wherein said polar organic solvent is an alkanol.

43. A process for producing a mother rod useful in the production of an optical fiber which comprises:
  (a) mixing a silicon alkoxide having the formula $Si(OR)_4$ wherein R is an alkyl group with, optionally, at least one compound selected from the group consisting of an alkoxide of an element required for obtaining a desired refractive index of a core portion of said optical fiber, phosphoric acid and boric acid; water; and, optionally, a polar organic solvent to prepare a uniform first mixed solution;
  (b) charging said first mixed solution into a first container having a predetermined shape;
  (c) gelatinizing said first mixed solution in said first container to form a first gel;
  (d) mixing a silicon alkoxide having the formula $Si(OR)_4$ wherein R is an alkyl group with, optionally, at least one compound selected from the group consisting of an alkoxide of an element required for obtaining a desired refractive index of a clad portion of said optical fiber, phosphoric acid and boric acid; water; and, optionally, a polar organic solvent to prepare a uniform second mixed solution;
  (e) placing said first gel at the center of a second container of predetermined shape and charging said second mixed solution into a tubular space between said first gel and the inside periphery of said second container;
  (f) gelatinizing said second mixed solution in said second container to form a dual-component gel;
  (g) drying said dual-component gel slowly to form a dry gel; and
  (h) heating said dry gel to gently raise the temperature thereof and then sintering said dry gel at the collapse temperature thereof but below the melting temperature of the dry gel.

44. The process of claim 43, wherein the mixed solution in step (a) comprises said silicon alkoxide, water and a polar organic solvent.

45. The process of claim 43, wherein the mixed solution in step (d) comprises said silicon alkoxide, water and a polar organic solvent.

46. The process of claim 43, wherein said polar organic solvent is a member selected from the group consisting of alkanols, acetone, dioxane, dimethylformamide and mixtures thereof.

47. The process of claim 43, wherein said polar organic solvent is an alkanol.

48. A process for producing a mother rod useful in the production of an optical fiber which comprises:
(a) mixing a silicon alkoxide having the general formula Si(OR)$_4$ wherein R is an alkyl group with, optionally, at least one compound selected from the group consisting of an alkoxide of an element required for obtaining a desired refractive index of a clad portion of said optical fiber, phosphoric acid and boric acid; water; and, optionally, a polar organic solvent to prepare a uniform first mixed solution;
(b) charging said first mixed solution into an annular first container having a predetermined shape;
(c) gelatinizing said first mixed solution in said first container to form a tubular first gel;
(d) mixing a silicon alkoxide having the formula Si(OR)$_4$ wherein R is an alkyl group with, optionally, at least one compound selected from the group consisting of an alkoxide of an element required for obtaining a desired refractive index of a core portion of said optical fiber, phosphoric acid and boric acid; water; and, optionally, a polar organic solvent to prepare a uniform second mixed solution;
(e) inserting said tubular first gel into a cylindrical second container having an inside diameter equal to the other diameter of said first gel, and charging said second mixed solution into the central portion of said second container;
(f) gelatinizing said second mixed solution in said second container to form a dual-component gel;
(g) drying said dual-component gel slowly to form a dry gel; and
(h) heating said dry gel to gently raise the temperature thereof and then sintering said dry gel at the collapse temperature thereof but below the melting temperature of the dry gel.

49. The process of claim 48, wherein the mixed solution in step (a) comprises said silicon alkoxide, water and a polar organic solvent.

50. The process of claim 48, wherein the mixed solution in step (d) comprises said silicon alkoxide, water and a polar organic solvent.

51. The process of claim 48, wherein said polar organic solvent is a member selected from the group consisting of alkanols, acetone, dioxane, dimethylformamide and mixtures thereof.

52. The process of claim 48, wherein said polar organic solvent is an alkanol.

53. The process of claim 1, wherein R is an alkyl group having from 1 to 4 carbon atoms.

54. The process of claim 20, wherein R is an alkyl group having from 1 to 4 carbon atoms.

55. The process of claim 43, wherein R is an alkyl group having from 1 to 4 carbon atoms.

56. The process of claim 48, wherein R is an alkyl group having from 1 to 4 carbon atoms.

* * * * *